(12) United States Patent
Pailhories

(10) Patent No.: US 9,845,822 B2
(45) Date of Patent: Dec. 19, 2017

(54) ATTACHMENT BOLT FOR POSITIVE LOCKING

(71) Applicant: LISI AEROSPACE, Paris (FR)

(72) Inventor: Guy Pailhories, Villefranche de Rouergue (FR)

(73) Assignee: LISI AEROSPACE, Paris (FR)

( * ) Notice: Subject to any disclaimer, the term of this patent is extended or adjusted under 35 U.S.C. 154(b) by 64 days.

(21) Appl. No.: 14/888,037

(22) PCT Filed: Apr. 28, 2014

(86) PCT No.: PCT/EP2014/058563
§ 371 (c)(1),
(2) Date: Oct. 29, 2015

(87) PCT Pub. No.: WO2014/177499
PCT Pub. Date: Nov. 6, 2014

(65) Prior Publication Data
US 2016/0076579 A1   Mar. 17, 2016

(30) Foreign Application Priority Data

May 2, 2013   (FR) ...................................... 13 54049

(51) Int. Cl.
*F16B 39/04*   (2006.01)
*F16B 39/284*   (2006.01)

(52) U.S. Cl.
CPC ............ *F16B 39/284* (2013.01); *F16B 39/04* (2013.01)

(58) Field of Classification Search
CPC ................................ F16B 39/04; F16B 39/284
(Continued)

(56) References Cited

U.S. PATENT DOCUMENTS 933,420 A  *  9/1909  Conradi ................. F16B 39/04
                                                    2/271
1,099,510 A      6/1914  O'Connor
(Continued)

FOREIGN PATENT DOCUMENTS

DE       225 045 C       8/1910
EP       2452082 B1      1/2015
(Continued)

OTHER PUBLICATIONS

Pöll, Andreas, International Search Report, Jun. 11, 2014, 6 pages, PCT/ISA Europe Patent Office.

*Primary Examiner* — Flemming Saether
(74) *Attorney, Agent, or Firm* — Henricks, Slavin & Holmes LLP

(57) ABSTRACT

A fastening bolt has a threaded screw (11) with a terminal portion (18) whose diameter (19) is less than that of the threaded portion, and an end surface (21) of said terminal portion has a transverse opening groove (22). The fastening bolt also has a nut (30) comprising a threaded body (32) and an unthreaded crown (34) drilled with at least two holes (35) diametrically opposite to one another and a rod (23), able to fit in the groove of the screw and in the two lateral holes of the nut to lock the bolt. The body of the nut comprises a driving portion (38), as well as a cylindrical portion (39) less thick than the driving portion, and the cylindrical portion (39) of the nut has an elliptical deformation that was previously a circular shape.

9 Claims, 2 Drawing Sheets

(58) Field of Classification Search
USPC .................. 411/277, 281–284, 315, 319, 320
See application file for complete search history.

(56) References Cited

U.S. PATENT DOCUMENTS

| | | | | |
|---|---|---|---|---|
| 1,320,095 | A | * | 10/1919 | Robinson .............. F16B 39/108 |
| | | | | 411/201 |
| 2,940,495 | A | | 6/1960 | Wing |
| 3,459,249 | A | * | 8/1969 | Jordan ................... B21K 1/707 |
| | | | | 411/282 |
| 3,621,502 | A | * | 11/1971 | Velthoven .............. B21K 1/707 |
| | | | | 411/282 |
| 3,971,085 | A | * | 7/1976 | Mount ................... F16B 39/284 |
| | | | | 411/277 |
| 8,793,857 | B2 | | 8/2014 | Fauchet et al. |
| 2010/0080666 | A1 | | 4/2010 | Dahl et al. |
| 2013/0149068 | A1 | * | 6/2013 | Jackson ................. F16B 39/04 |
| | | | | 411/315 |

FOREIGN PATENT DOCUMENTS

| | | |
|---|---|---|
| FR | 546 336 | 11/1922 |
| FR | 716 549 A | 12/1931 |
| FR | 2 955 632 A1 | 7/2011 |
| GB | 497 872 | 12/1931 |
| GB | 1 048 382 A | 11/1966 |
| WO | WO 2011/004104 A1 | 1/2011 |

* cited by examiner

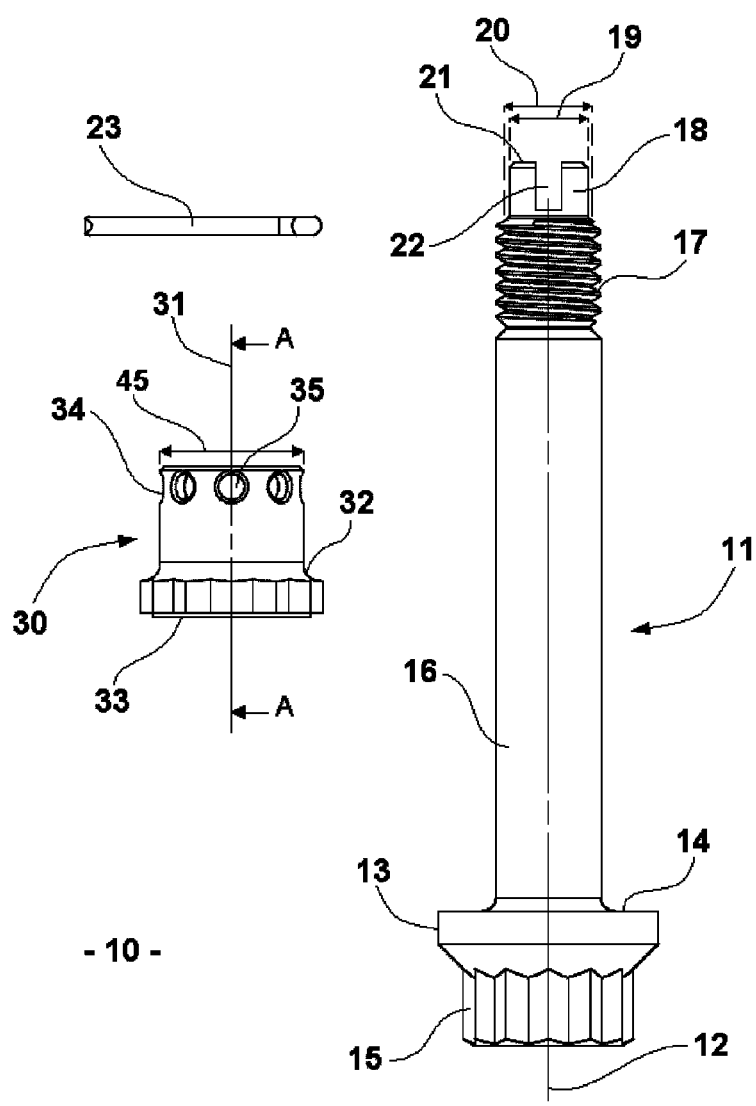
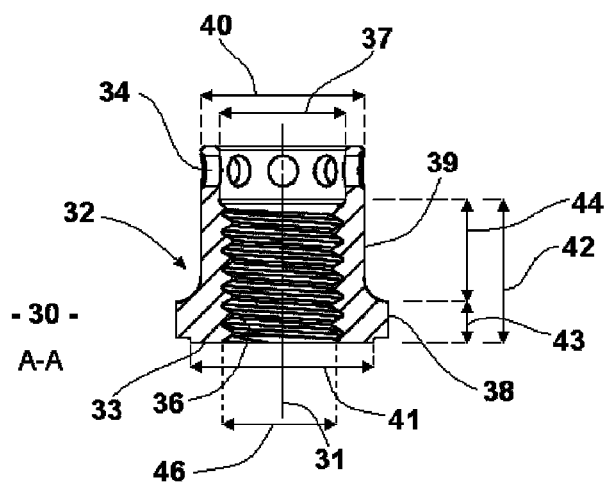
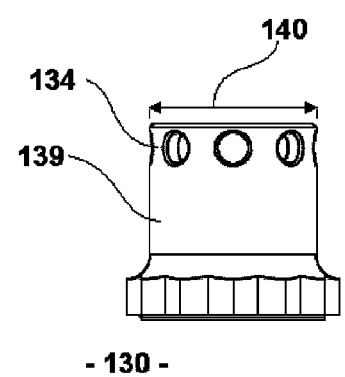
Fig. 1
Fig. 2
Fig. 3

ATTACHMENT BOLT FOR POSITIVE LOCKING

CROSS REFERENCE TO RELATED APPLICATIONS

This application is a National Stage of International Application No. PCT/EP2014/058563, filed Apr. 28, 2014, which claims priority to FR1354049 filed May 2, 2013.

BACKGROUND

The present invention relates to a fastening bolt comprising a screw and a nut, equipped with a safety device preventing the nut from being loosened on the screw.

In aeronautics, for example, for fasteners attaching motors to aircraft structures, it is necessary to give the fasteners a high level of safety given the risks of loosening, despite the heavy vibrations they are subject to. To that end, the tension imparted to a nut when it is tightened on a screw must be preserved in all circumstances, including after a period of use during which said fasteners may have been removed and then reinstalled multiple times.

It is known to use slotted nuts combined with screws that have rod holes, such as those described in document FR2955632.

In such a device, the nut comprises a threaded skirt that has undergone locking by elliptical deformation, meaning that the initially circular cross-section of the skirt has been flattened slightly. When tightened onto the threads of a circular cross-section screw, the skirt is forced to assume such a circular shape, which imparts a tension to the threads that impedes the loosening of the nut.

Furthermore, the skirt has an end forming slots, in which a rod housed in a hole passing through one end of the screw is fitted. The presence of the rod also prevents the nut from rotating around the screw.

Such devices, however, have a major risk of getting stuck due to the interference between the nut and the screw created by the deformation of the nut. This is because the slots of the nut or threaded skirt, deformed by the locking effect, might penetrate into the outlet bevels of the rod holes, when the nut is installed on the screw. The risk is present in steel screw/ nut assemblies, and even more so for screw/nut assemblies in which at least one is made of titanium, for which the locking phenomenon is increased due to its poor tribological properties.

Furthermore, vibration tests have shown cases of fragile breakage of slots of existing fasteners.

Additionally, the practice has shown that in such devices, the elliptical deformation initially imposed on the threaded skirt exhibits a strong tendency to decrease after the fastener is removed and reinstalled several times, such that a substantial decline in the locking torque normally caused by that deformation is observed. This is because for some lock nuts of the prior art, the first installation of the nut on the screw causes a sizable reverse deformation of said nut towards a circular cross-section. When the nut is removed and the reinstalled, that plastic deformation causes a sizable decline in the locking torque.

In order to preserve the principle of dual security against unwanted loosening, despite the effect of removing and reinstalling the fasteners, an alternative was therefore sought to the solution consisting of combining a traditional slotted nut and a screw comprising a rod hole.

A first option consists of having the screw support a slot and having the nut support the rod holes, as in the device described in document U.S. Pat. No. 1,099,510. This document describes a screw whose outer surface comprises a slope receiving a rod, said rod passing through holes supported by lateral flanks of an associated nut.

However, the device of document U.S. Pat. No. 1,099,510 is obviously ill-suited to aeronautical use, and its shape makes elliptical deformation locking impossible. Furthermore, it does not solve the problem caused by being installed and removed in succession.

SUMMARY

One object of the invention is to solve the problems stated previously, by proposing a fastening bolt with dual anti-loosening security, that does not have the drawbacks of the slotted nuts known from the prior art.

To that end, one object of the invention is a fastening bolt, comprising a screw, said screw comprising a head, a threaded portion disposed along a first axis and a terminal portion, said terminal portion being adjacent along the first axis to the threaded portion, said terminal portion having a diameter less than a minimum diameter of the threaded portion, one end surface of said terminal portion comprising a transverse opening groove; the bolt further comprising a nut itself comprising a front bearing face, a threaded body disposed along a second axis comprising a threaded chimney and an unthreaded crown adjacent to the threaded body adjacent to the threaded body along the second axis, on the side opposite the bearing face; said crown being pierced by at least two lateral holes, diametrically opposite one another; the bolt further comprising a rod, capable of being inserted into the groove of the screw and in the two lateral holes of the nut.

According to the invention, the nut comes from a method comprising an elliptical deformation of the chimney previously in a circular shape.

Furthermore, the ratio between the outer diameter of the chimney before deformation and the nominal diameter of the nut is between 1.30 and 1.35 inclusive.

Additionally, the ratio between the height of the threaded chimney and the nominal diameter of the nut is greater than or equal to 0.65.

Advantageously, the first diameter ratio ensures an ideal wall rigidity, while the second diameter ratio ensures minimum wall flexibility.

In this configuration, it is possible to achieve dual security by locking the nut and by holding it in place using a rod, without running up against the drawbacks related to the slots of the nut of the prior art.

Furthermore, the groove of the screw and the lateral holes of the nut are easier to machine than the slotted nut, which requires delicate deburring. The forming of the holes in the crown of the nut is simplified by the fact that the crown does not include a thread, which is not the case in the document U.S. Pat. No. 1,099,510.

Furthermore, the height and diameter characteristics of the chimney give it increased elasticity with respect to the nuts of the prior art, which makes it possible to increase the possible number of usage cycles of the inventive bolt. By encouraging the elasticity of the nut, a stability in the locking torque is advantageously achieved over the course of several removal/reinstallation cycles of the nut on the screw.

Preferentially, a minimum inner diameter of the unthreaded elliptical crown is greater than a diameter of the terminal portion of the screw. "Minimum inner diameter" refers to the smallest diameter of the ellipse. Thus, even taking into account the elliptical deformation of the crown, all risk of the edges of the groove of the screw getting meshed in the holes of the crown or in the deformed chimney is eliminated when the nut is installed on the screw.

Also preferentially, a smaller outer diameter of said chimney is less than an minimum outer diameter of the driving portion;

Preferentially, a length of the driving portion along the second axis is less than one-third the total length of the threaded body along said axis. Thus, the mass of the nut is reduced, without altering its elastic properties.

According to one particular embodiment, the nut comes from a method comprising an elliptical deformation of the threaded chimney and crown previously in a circular shape.

The invention will be better understood when reading the following description and examining the accompanying figures. These are provided for information purposes only and are not exhaustive concerning the invention. The figures illustrate the following:

BRIEF DESCRIPTION OF THE DRAWINGS

FIG. 1: An exploded view of a fastening bolt according to one embodiment of the invention;

FIG. 2: A cross-section view of a nut member of FIG. 1 after elliptical deformation;

FIG. 3: A cross-section view of a nut member of FIG. 1 before elliptical deformation;

DETAILED DESCRIPTION

Figure 4:
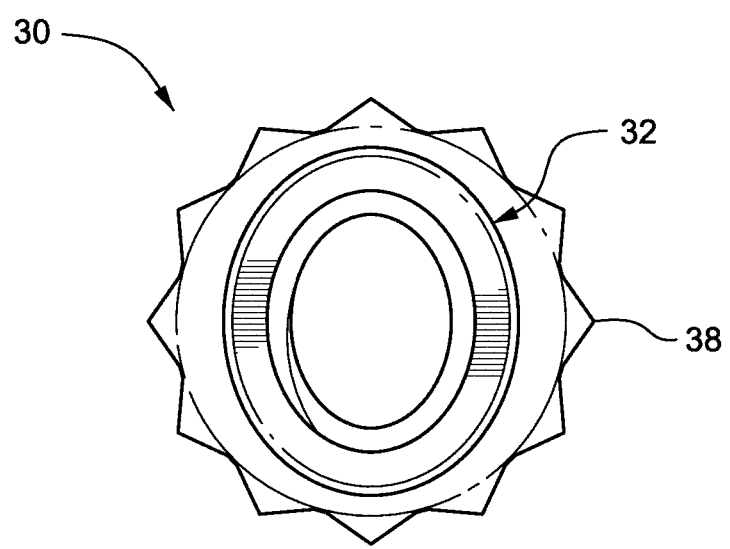
FIG. 4: A top plan view of a nut member of FIG. 1 after elliptical deformation.

FIG. 1 shows a side of a fastening bolt according to one embodiment of the invention, in an unassembled form.

The bolt 10 comprises a screw 11, disposed along a first axis 12. The screw 11 comprises a head 13, said head 13 possessing a bearing surface 14 able to come into contact with a structure to be assembled. The head 13 further possess a lateral driving surface 15, able to mate with an assembling tool. In the example of FIG. 1, the surface 15 has a shape called "bi-hexagonal" or "twelve-toothed."

The head 13 is extended along the axis 12 by a cylindrical shaft 16. The shaft 16 is itself extended by a threaded portion 17. One end of the screw 11 opposite the head is formed by a terminal portion 18, which extends the threaded portion 17 along the axis 12. The terminal portion 18 has a smooth lateral surface, whose diameter 19 is less than a minimum diameter 20 of the threaded portion 17. "Minimum diameter" refers to the root diameter of the threaded portion 17.

One end face 21 of said terminal portion comprises a transverse opening groove 22. This groove is able to accommodate a rod 23 when the bolt 10 is assembled.

As is visible in FIG. 1, the groove 22 has a slotted cross-section, but alternative shapes are possible.

Furthermore, the bolt 10 comprises a nut 30, disposed along a second axis 31. When the bolt 10 is assembled, the first axis 12 and the second axis 31 are identical.

The nut 30 comprises a head 32, of which one end along axis 31 supports a front bearing surface 33 able to come into contact with a structure to be assembled. Another end of the body 32 is extended by a crown 34, said crown being pierced by at least two lateral holes 35, diametrically opposite one another. The holes 35 are able to accommodate a rod 23 when the bolt 10 is assembled.

FIG. 2 depicts a cross-section view of the nut 30, along a cross-section plane A-A, passing through the axis 31 and perpendicular to FIG. 1.

A thread 36 is formed on the inner surface of the body 32. The thread 36 is able to cooperate with the threaded portion 17 of the screw 11 when installing the nut on the screw.

The crown 34 atop the body 32 is not threaded, and an inner diameter 37 of said crown is preferentially greater than a root diameter of the thread 36.

The threaded body 32 of the nut comprises a driving portion 38 close to the bearing surface 33. An outer lateral surface of said portion 38 is able to mate with a tool assembling the nut onto the screw. In the example in FIGS. 1 and 2, the driving portion 38 has a "bi-hexagonal" or "twelve-toothed" shape.

The body 32 further comprises a chimney 39, located between the driving portion 38 and the crown 34.

The chimney 39 is preferentially chosen to be of low thickness. More preferentially, a smaller outer diameter 40 of the chimney is less than an minimum outer diameter 41 of the driving portion 38.

A total height 42 of the threaded body 32 along the axis 31 between the bearing surface 33 and an end of the threading 36 is equal to a height 43 of the driving portion 38 plus a height 44 of the chimney 39.

Furthermore, the chimney 39, and potentially the crown 34, have an oval or elliptical shape. More specifically, the outer diameter 40 of the chimney, and potentially that of the crown, as can be seen in FIG. 2, are slightly less than the outer diameter 45 of the crown 34, as can be seen in FIG. 1.

The diameter 40 represents the smallest diameter of the ellipse formed by an outer edge of the crown 34 and the diameter 45 represents the largest diameter of said ellipse.

This elliptical shape is created during the manufacturing of the nut 30, from the nut 130 depicted in FIG. 3. The chimney 139 and the crown 134 of the nut 130 have a circular cross-section.

The elliptical deformation of the nut 130 is created in a known manner, by pinching or flattening the chimney 139 and potentially the crown 134, before a heat treatment. A similar method is, for example, described in the document EP2452082.

Preferentially, the elliptical deformation is carried out at the midpoint of the chimney 139, meaning at an equal distance from the driving portion and the crown 134.

The elliptical shape of the thread of the chimney 39 ensures the immobilization of the nut 30 on the screw 11, by locking, when the bolt 10 is assembled. The bolt 10 therefore has dual anti-loosening safety: Both the locking effect and the rod 23 holding system.

In a known manner, it is desirable for the small diameter 40 of the ellipse to be narrow enough to ensure the locking function, but without the deformation exceeding the elastic limit of the material forming the nut. Thus, when the screw is introduced into the nut 30 for the first time, the nut will elastically, and not plastically, deform.

Preferentially, the inner diameter 37 of the crown 34, which corresponds to the smallest diameter of the ellipse, is greater than the diameter 19 of the terminal portion of the screw 11. Thus, there is no risk that the edges of the groove 22 will become enmeshed in the holes 35 when the nut 30 is installed on the screw 11.

Relative to the total height 42, along the axis 31, of the threaded body 32, the chimney 39 is higher than the chimneys of the nuts of the prior art, such as the slotted nut of document FR2955632.

Furthermore, the outer diameter 140 of the chimney 139 before deformation and a nominal diameter 46 of the nut have a ratio between 1.30 and 1.35 inclusive. The ratio between the diameter 140 and the diameter 46 is, for example, equal to 1.33.

Additionally, the ratio between the height 44 of the threaded chimney 39 and the nominal diameter 46 of the nut is greater than or equal to 0.65.

"Nominal diameter of the nut" refers to a value indicating the size of the nut, e.g. 6 mm or ¼ inch. The nominal diameter corresponds to a minimum root diameter of the nut according to the AS8879 standard. In the context of the present invention, that minimum diameter is measured in the driving portion, which does not undergo any deformation during manufacturing.

These height and diameter characteristics of the chimney 39 advantageously give that chimney an elasticity that enables it to deform circularly when the nut is assembled on the screw, then returns to its elliptical shape when disassembled. The bolt 10 therefore has a stable behavior over many installation cycles.

According to another preferential form of the invention, the height 43 of the driving portion 38 is less than or equal to one-third the total height 42 of the threaded body. Thus, the driving height is enough to allow the tightness torque to change without making the nut heavier.

The bolt 10 of FIG. 1 has particularly been compared to bolts of the prior art, with the nut being locked by elliptical deformation as in document FR2955632.

The bolts have been subjected to assembly/disassembly tests according to the NFL22-500 standard: Maximum screwing torque: 6.6 N·m; tightness torque: 43 N·m; minimum unscrewing torque: 1.16 N·m. The tests were conducted on an automatic measurement instrument, at 10 rpm.

In bolts of the prior art, after five assembly/disassembly cycles, the small diameter of the ellipse of the elliptical deformation of the nut substantially increased, and no longer provides a sufficient locking function. The nut plastically deforms when installed on the screw.

On the other hand, steel nuts 30 maintain their elliptical shape without a plastic deformation of the small ellipse diameter after fifty assembly/disassembly cycles on screws 11 made of titanium alloy TA6V, coated and lubricated, for example with the HI-KOTE® NC coating distributed by the company Hi-Shear Corp and cetyl alcohol. The smallest inner diameter 37 of the ellipse was measured for ten new nuts 30, as well as ten nuts 30 that have undergone assembly/disassembly cycles. The results are listed in table 1 below:

which ensures a stability of the screw/nut locking torque during repeated installation/removal cycles.

Equivalent tests were conducted on nuts 30 and screws 11 made of TA6V titanium alloy, each of said parts being coated appropriately. An appropriate coating is, for example, a solid lubricant film like MoS2 or a dyed corrosion-resistant coating like HI-KOTE® or Kalgard® FA. The results show that the TA6V titanium alloy nuts withstand at least fifteen installation/removal cycles on TA6V titanium alloy screws.

The invention claimed is:

1. Fastening bolt comprising:
   a screw, said screw comprising a head, a threaded portion disposed along a first axis, and a terminal portion, said terminal portion being adjacent along the first axis to the threaded portion, said terminal portion having a diameter less than a minimum diameter of the threaded portion, said terminal portion having an end face with a transverse opening groove in the end face;
   a nut comprising a front bearing surface, a threaded body disposed along a second axis comprising a threaded portion, and the nut further including an unthreaded crown, adjacent to the threaded body along the second axis, on a side of the nut opposite the bearing surface, said crown having at least two lateral holes, diametrically opposite one another;
   a rod, able to fit in the groove of the screw and in the two lateral holes of the nut;
   said bolt being characterized in that:
   the nut has an elliptical deformation of the threaded portion previously in a circular shape having an outer diameter,
   the ratio between the outer diameter of the threaded portion before deformation and a nominal diameter of the nut is between 1.30 and 1.35 inclusive; and
   the ratio between the height of the threaded portion and the nominal diameter of the nut is greater than or equal to 0.65.

2. A fastening bolt according to claim 1, such that the threaded body of the nut comprises a driving portion close to the front bearing surface, an outer lateral surface of said driving portion being able to mate with an assembly tool.

3. A fastening bolt according to claim 2, such that the threaded portion is disposed between the driving portion and the unthreaded crown.

4. A fastening bolt according to claim 1, such that a smaller outer diameter of the elliptically deformed threaded portion is less than a minimum outer diameter of the driving portion.

TABLE 1

| Small diameter (mm) | 1 | 2 | 3 | 4 | 5 | 6 | 7 | 8 | 9 | 10 | Average |
|---|---|---|---|---|---|---|---|---|---|---|---|
| New nut | 12.9 | 12.9 | 12.8 | 12.9 | 13.0 | 13.0 | 13.0 | 12.9 | 12.9 | 13.0 | 12.93 |
| Nut after 50 cycles | 12.9 | 13.0 | 13.1 | 12.9 | 12.9 | 13.0 | 13.0 | 12.8 | 12.9 | 12.9 | 12.94 |

The results above show that the dimensions of the ellipse formed by the chimney 39 and the crown 34 barely vary at all after fifty installation/removal cycles on one screw 11.

Compared to the nuts of the prior art, the height and diameter of the chimney 39 therefore make it possible to increase the elasticity of said nut, such that the elastic deformation limit is not exceeded when the nut is installed on the screw. The elliptical shape is thereby preserved, 5. A fastening bolt according to claim 1, such that the nut comes from a method comprising an elliptical deformation of the threaded portion and the unthreaded crown previously in a circular shape.

6. A fastening bolt according to claim 5, such that a minimum inner diameter of the unthreaded elliptical crown is greater than a diameter of the terminal portion of the screw.

7. A fastening bolt according to claim 1, such that the threaded body of the nut comprises a driving portion and that a length of the driving portion along the second axis is less than or equal to one-third the total length of the threaded body along said axis.

8. A fastening bolt according to claim 1, such that the nut is made of steel and the screw is made of a titanium alloy.

9. A fastening bolt according to claim 1, such that the nut and the screw are made of a titanium alloy.

* * * * *